US 9,573,611 B2

(12) United States Patent
Coyle

(10) Patent No.: US 9,573,611 B2
(45) Date of Patent: Feb. 21, 2017

(54) COLLAPSIBLE PERSONAL SHOPPING CART

(71) Applicant: Kari Coyle, Lakeland, FL (US)

(72) Inventor: Kari Coyle, Lakeland, FL (US)

(*) Notice: Subject to any disclaimer, the term of this patent is extended or adjusted under 35 U.S.C. 154(b) by 0 days.

(21) Appl. No.: 14/839,295

(22) Filed: Aug. 28, 2015

(65) Prior Publication Data
US 2016/0068177 A1 Mar. 10, 2016

Related U.S. Application Data

(60) Provisional application No. 62/047,743, filed on Sep. 9, 2014.

(51) Int. Cl.
B62B 3/00 (2006.01)
B62B 3/02 (2006.01)
B62B 3/08 (2006.01)

(52) U.S. Cl.
CPC ..................................... B62B 3/027 (2013.01)

(58) Field of Classification Search
CPC ............... B62B 3/00; B62B 3/02; B62B 3/08; B62B 3/022; B62B 3/027; B62B 3/14; B62B 3/182; B62B 3/1496; B62B 2206/04; B62B 2206/06; B62B 7/10; B62B 7/105; B62B 7/066
See application file for complete search history.

(56) References Cited

U.S. PATENT DOCUMENTS

| 2,133,834 | A | * | 10/1938 | Sheldon | B62B 3/1464 280/33.995 |
| 2,616,719 | A | * | 11/1952 | Heideman | B62B 7/10 280/648 |
| 2,785,724 | A | * | 3/1957 | Gold | B65D 33/02 220/9.2 |
| 3,173,704 | A | * | 3/1965 | Boudreau | B62B 7/10 267/5 |
| 3,400,942 | A | * | 9/1968 | Hull | B62B 5/0083 280/35 |
| 3,881,739 | A | * | 5/1975 | Laune | B62B 7/10 280/42 |
| 4,412,689 | A | * | 11/1983 | Lee | B62B 7/10 211/172 |
| 4,865,346 | A | * | 9/1989 | Carlile | B62B 1/12 211/132.1 |
| 4,953,887 | A | * | 9/1990 | Takahashi | B62B 9/26 280/47.38 |
| 5,915,722 | A | * | 6/1999 | Thrasher | B62B 1/12 280/649 |
| 5,921,574 | A | * | 7/1999 | Driessen | B62B 7/10 280/47.371 |

(Continued)

Primary Examiner — J. Allen Shriver, II
Assistant Examiner — Travis Coolman
(74) Attorney, Agent, or Firm — Jason T. Daniel, Esq.; Daniel Law Offices, P.A.

(57) ABSTRACT

A collapsible personal shopping cart device includes a rolling frame assembly having a plurality panels that are joined together. A set of wheels extend from the bottom of the frame assembly, and two of the panels include pivoting handle receivers. A telescoping handle assembly is connected to the handle receivers, and a basket assembly is suspended from the handle assembly. The device transitions from an extended position to a fully collapsed position for storage.

12 Claims, 7 Drawing Sheets

(56) References Cited

U.S. PATENT DOCUMENTS

| | | | |
|---|---|---|---|
| 7,055,847 B2 * | 6/2006 | Miller | B62B 3/022 |
| | | | 248/161 |
| 7,168,715 B1 * | 1/2007 | Friedman | B62B 3/006 |
| | | | 280/33.991 |
| 7,396,038 B2 * | 7/2008 | Zweideck | B62B 7/08 |
| | | | 280/47.38 |
| 8,550,474 B2 * | 10/2013 | Geva | B62B 3/027 |
| | | | 280/35 |
| 9,050,988 B1 * | 6/2015 | McLeod | B62B 3/022 |
| 2004/0070179 A1 * | 4/2004 | Miller | B62B 3/022 |
| | | | 280/651 |
| 2014/0028003 A1 * | 1/2014 | Saville | B62B 7/10 |
| | | | 280/650 |

* cited by examiner

COLLAPSIBLE PERSONAL SHOPPING CART

CROSS-REFERENCE TO RELATED APPLICATIONS

This application claims the benefit of U.S. Application Ser. No. 62/047,743 filed on Sep. 9, 2014, the contents of which are incorporated herein by reference.

TECHNICAL FIELD

The present invention relates generally to shopping aids, and more particularly to a portable and collapsible shopping cart for personal use.

BACKGROUND

The statements in this section merely provide background information related to the present disclosure and may not constitute prior art.

It is estimated that in 2014 alone, American consumers spent nearly 10.7 trillion dollars shopping. In this regard, the American landscape is filled with shopping facilities such as grocery stores, outlet malls, mega shopping malls, and smaller strip malls, wherein consumers can view and purchase an endless variety of goods.

In order to aid consumers in handling merchandise, many stores provide known and familiar shopping carts for use by the customer within the store. Such a feature is extremely useful when shopping at a large store such as a grocer, or a big box store, for example, wherein the customer remains within a single facility for a prolonged period of time. Unfortunately, many smaller stores which make up the bulk of outlet centers, strip malls and mega malls, do not provide shopping carts for their customers.

As a result, whenever a customer makes a purchase, he or she must typically carry the purchased item(s) (along with their purse and/or any personal items) from one store to another. Such a process is physically difficult, and can cause the customer to become tired, thus leading to a shortened visit. Alternatively, the customer can walk to their vehicle, deposit their purchased items there, and then walk back to the shopping center. Unfortunately, studies have confirmed that this practice is inherently unsafe, as unsavory individuals often prowl parking lots in search of unattended vehicles laden with newly purchased items.

Accordingly, it would be beneficial to provide a lightweight personal shopping cart that is collapsible for easy storage, and which can function to allow an individual to easily and securely transport their purchases from one store to another during a shopping trip without suffering from the drawbacks discussed above.

SUMMARY OF THE INVENTION

The present invention is directed to a collapsible personal shopping cart device. One embodiment of the present invention can include a rolling frame assembly having a plurality of wheels. The device can also include a telescoping handle assembly, is pivotally connected to the rolling frame assembly and can transition between an extended and retracted state, and can pivot between a generally horizontal position and a generally vertical position. The device can also include a basket assembly having a rigid frame that is suspended between the upper portions of the handle assembly. The entire device can transition between a fully extended position and a fully collapsed position for storage.

Another embodiment of the present invention can include a removable basket body having handles for transporting the basket without the other elements. The basket assembly can also pivot between a vertical and horizontal position depending on the orientation of the cart.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
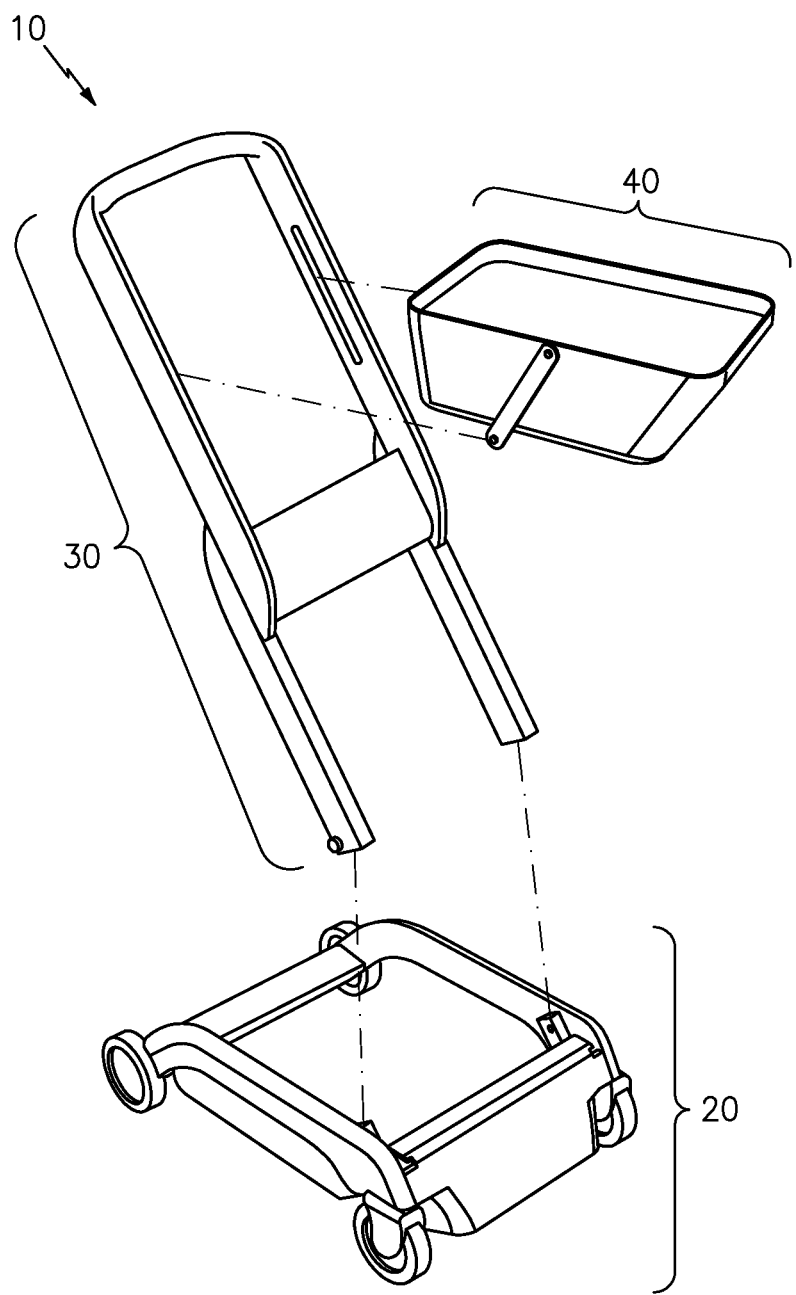
FIG. 1 is an exploded parts view of the collapsible personal shopping cart that is useful for understanding the inventive concepts disclosed herein.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

As described herein, the term "pivotally secured," "rotatably connected" and all derivatives shall be used interchangeably to describe a situation wherein two or more objects are joined together in a manner that allows one or both of the objects to pivot and/or rotate about or in relation to the other object. Several nonlimiting examples of hardware for pivotally securing items together include pivoting couplers and swivel flanges, for example. As described herein, the term "removably secured," and derivatives thereof shall be used to describe a situation wherein two or more objects are joined together in a non-permanent manner so as to allow the same objects to be repeatedly joined and separated.

A collapsible personal shopping cart is described below with respect to the figures. As will be known to those of skill in the art, the below descriptions and illustrations are to provide but one means for performing the inventive concepts and are not to be limiting in any way as to system components. Identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

FIG. 1 is an exploded parts view of a personal shopping cart device 10, in accordance with one embodiment of the invention. As shown, the device 10 can include, essentially, a rolling frame assembly 20, a telescoping handle assembly 30 and a basket assembly 40.

Figure 2:
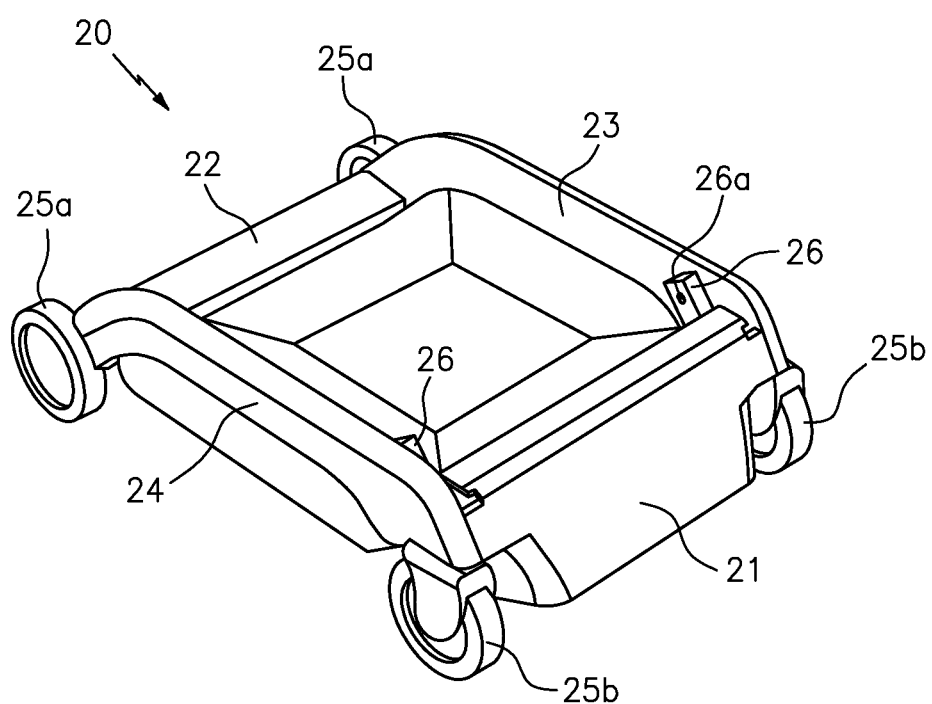
FIG. 2 is a perspective view of the rolling frame assembly of the collapsible personal shopping cart, in accordance with one embodiment of the invention.
Figure 5:
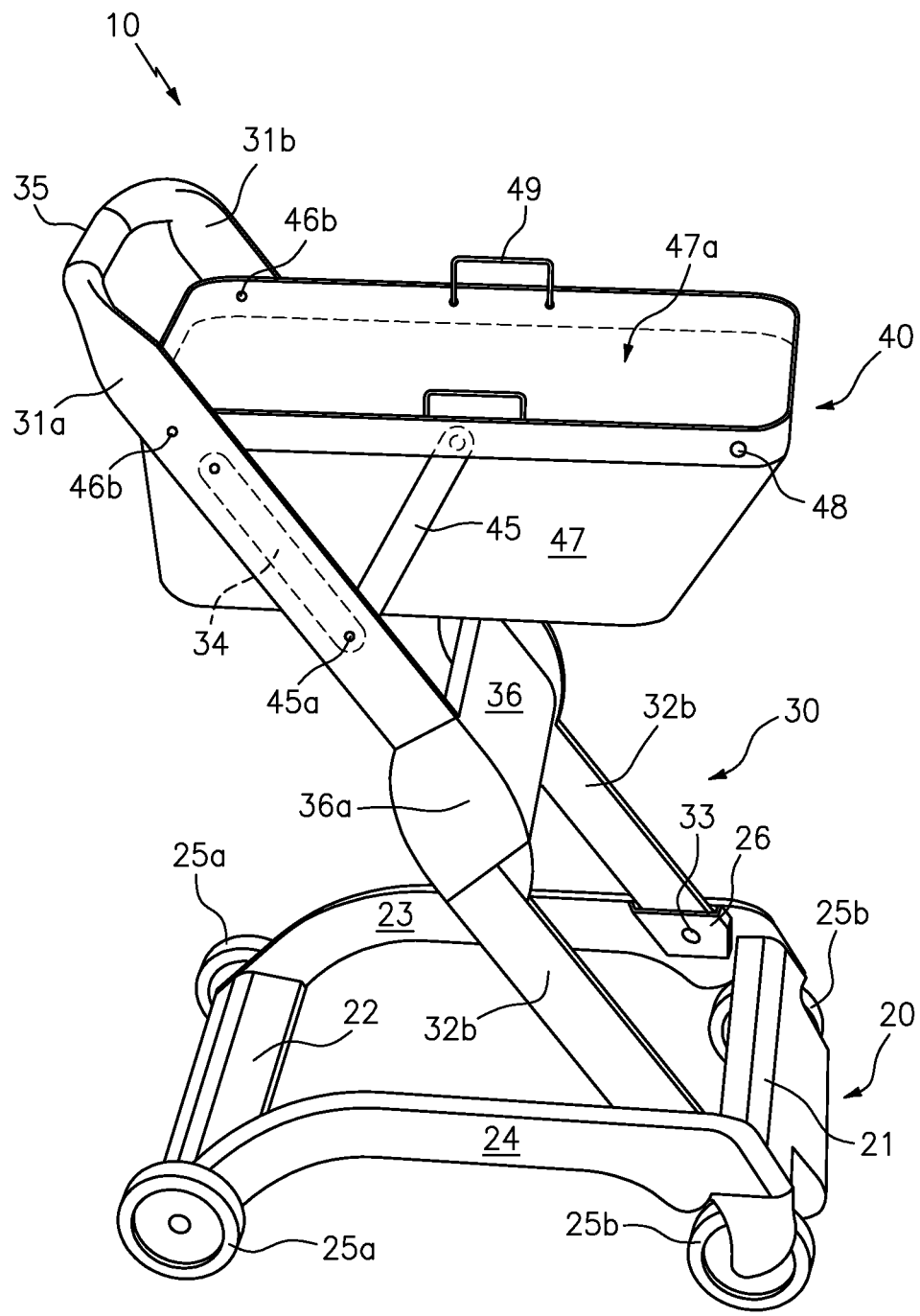
FIG. 5 is a side view of the collapsible personal shopping cart device in the fully extended position, in accordance with one embodiment of the invention.
Figure 6:
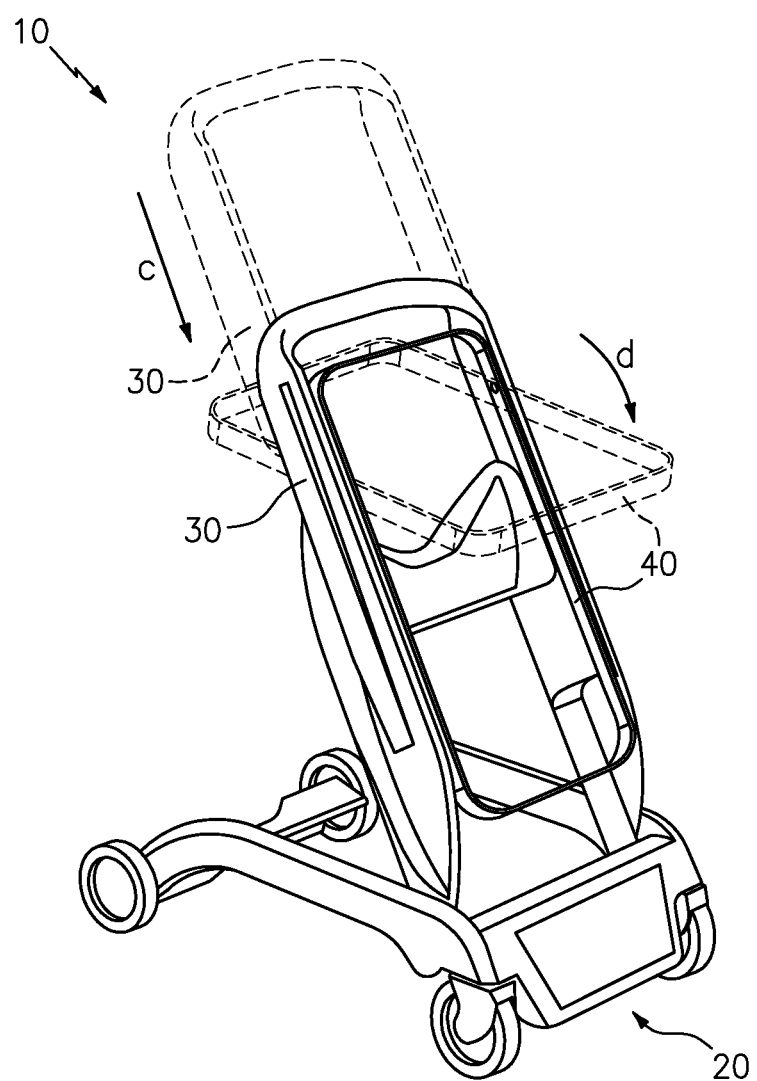
FIG. 6 is a perspective view of the collapsible personal shopping cart device in the partially extended position, in accordance with one embodiment of the invention.

The rolling frame assembly 20 provides a support base for the telescoping handle assembly, and allows the device to roll when in both the extended configuration (See FIG. 5) and the collapsed configuration (See FIG. 6). FIG. 2 illustrates one embodiment of a rolling frame assembly 20, which includes a front panel 21, a rear panel 22, and a pair of opposing side panels 23 and 24, respectively. In the preferred embodiment, the panels 21-24 can be constructed from lightweight, sturdy plastic, and can form a generally square shaped frame member. As shown, the frame member includes a plurality of wheels along each corner. In the preferred embodiment, the rear wheels 25a can include a fixed orientation, whereas front wheels 25b can be omnidirectional.

In one embodiment, the frame assembly 20 can further include a set of pivoting handle receivers 26 that are disposed along the inside facing portions of the side panels 23 and 24, at a location adjacent to the front panel 21. The handle receivers 26 can function to receive the bottom end of the handle assembly 30, and can allow the same to pivot between a generally horizontal position when the device is in the collapsed configuration, and a generally vertical position when the device is in the extended configuration.

To this end, the handle receivers can include a generally hollow channel having an open top end and an aperture 26a through which securing hardware 33 such as a nut or bolt, for example, can be passed, so as to secure the handle assembly 30 to the frame assembly 20. The handle receivers can be pivotally secured onto each of the side panels by a spring loaded connector, for example, however any type of pivot connector can be utilized herein.

Although described above as including a particular shape and construction material, this is for illustrative purposes only, as the frame assembly can include any number of different shapes such as round or rectangular, for example, and can be constructed from any type of generally lightweight material such as aluminum, PVC and various composite materials, for example.

Figure 3:
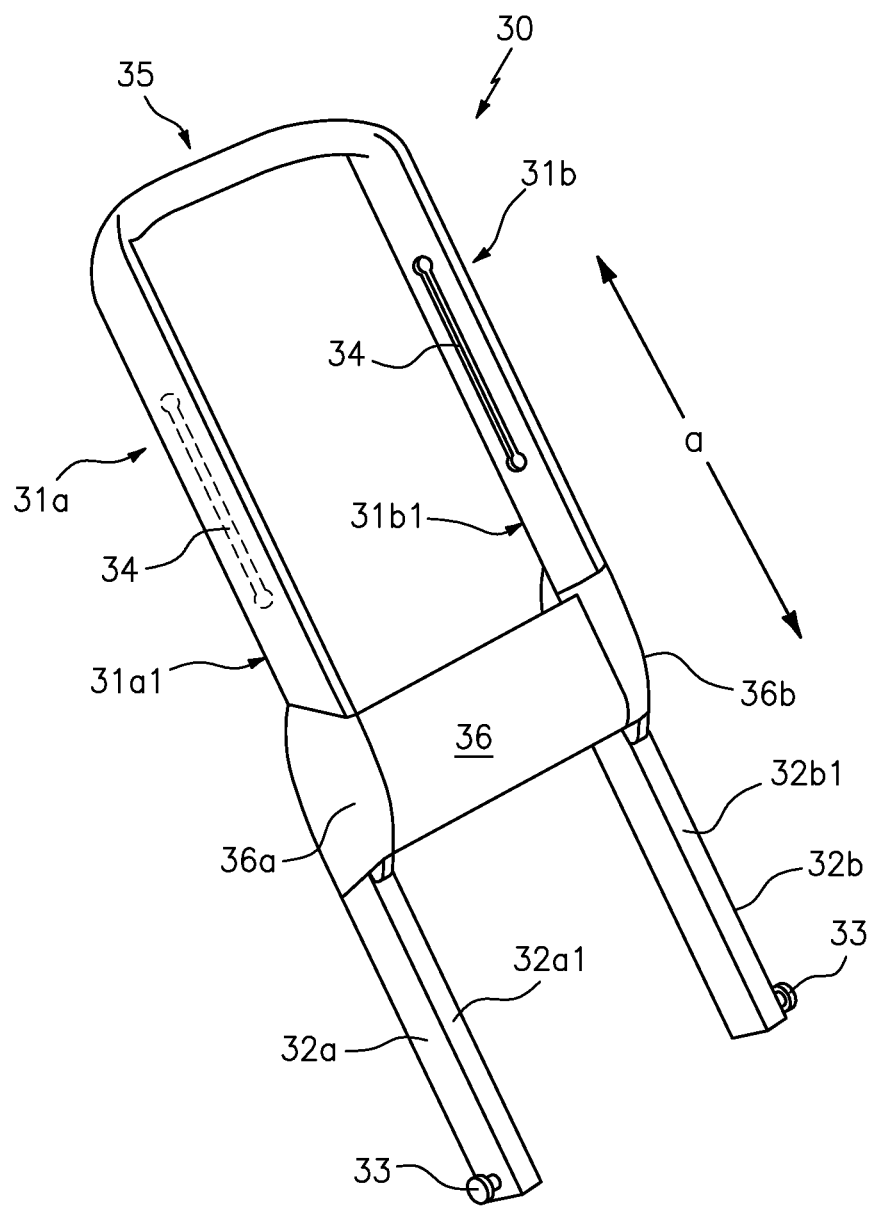
FIG. 3 is a perspective view of the handle assembly of the collapsible personal shopping cart, in accordance with one embodiment of the invention.

The telescoping handle assembly 30 functions as a user handle, and also supports the weight of the basket assembly 40. FIG. 3 illustrates one embodiment of the handle assembly 30, which includes a set of generally parallel-oriented upper handle segments 31a and 31b that are slidingly connected to a set of generally parallel-oriented lower handle segments 32a and 32b, respectively.

As shown, each of the lower handle segments can include hardware 33 such as a nut and bolt assembly, for example, that can function to secure the bottom end of the lower handle segments to or within the handle receivers 26 of the frame assembly 20. Likewise, each of the upper handle segments can further include an elongated basket receiver channel 34, which can function to receive the protruding coupler 45a of the below described basket assembly 40. Additionally, a main handle element 35 can be connected to each of the upper handle segments along a top end thereof. The handle element 35 can include any number of optional features to promote user comfort such as a padded grip section and/or a cup holder, for example.

The telescoping handle assembly can further include a central support member 36 that extends between the handle segments, and functions to provide lateral stability to the device. In one embodiment, the central support member can be secured along the bottom end of the upper handle segments, and can further include locking mechanisms 36a and 36b, such as U-clamp's, for example, along each end.

The locking mechanisms can function to secure the bottom surfaces 31a1 and 31b1 of the upper handle segments to the top facing surface 32a1 and 32b1 of the lower handle segments, respectively. As shown by arrow a, and as described below, the locking mechanisms can allow the upper handle segments to slide along the length of the lower handle segments so as to transition between an extended and retracted position, respectively. The locking mechanisms can also function to lock the handle in either the extended or retracted position.

Although described as including fixed length upper and lower handle segments that are slidingly engaged, the device is not limited to this construction. In this regard, the device can also include a set of telescoping handle segments wherein either the upper or lower handle segments slide within, and extend outward from the other. Telescoping devices and mechanisms to permit movement of the same are well known in the art.

Figure 4B:
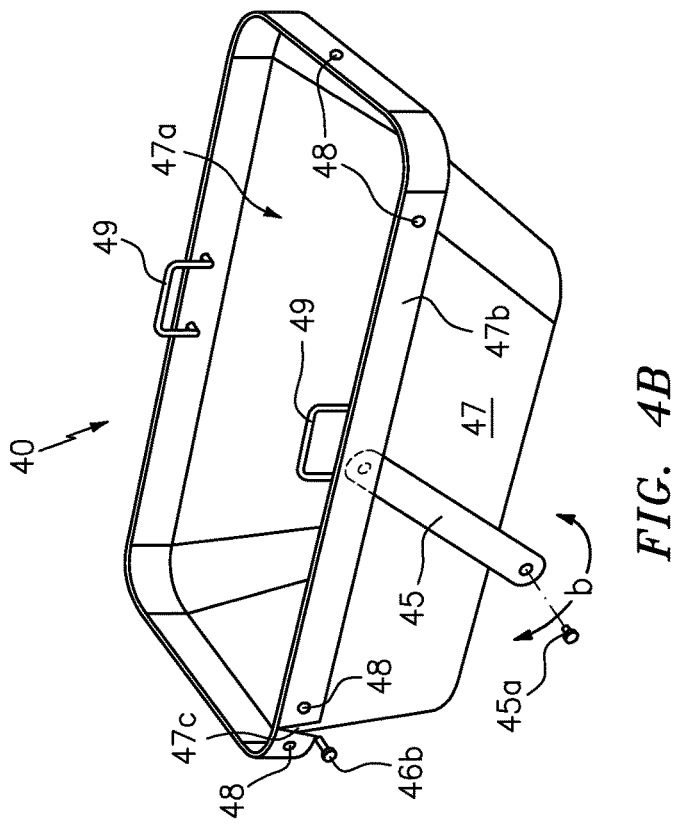
FIG. 4B is another perspective view of the basket assembly of the collapsible personal shopping cart, in accordance with one embodiment of the invention.
Figure 4A:
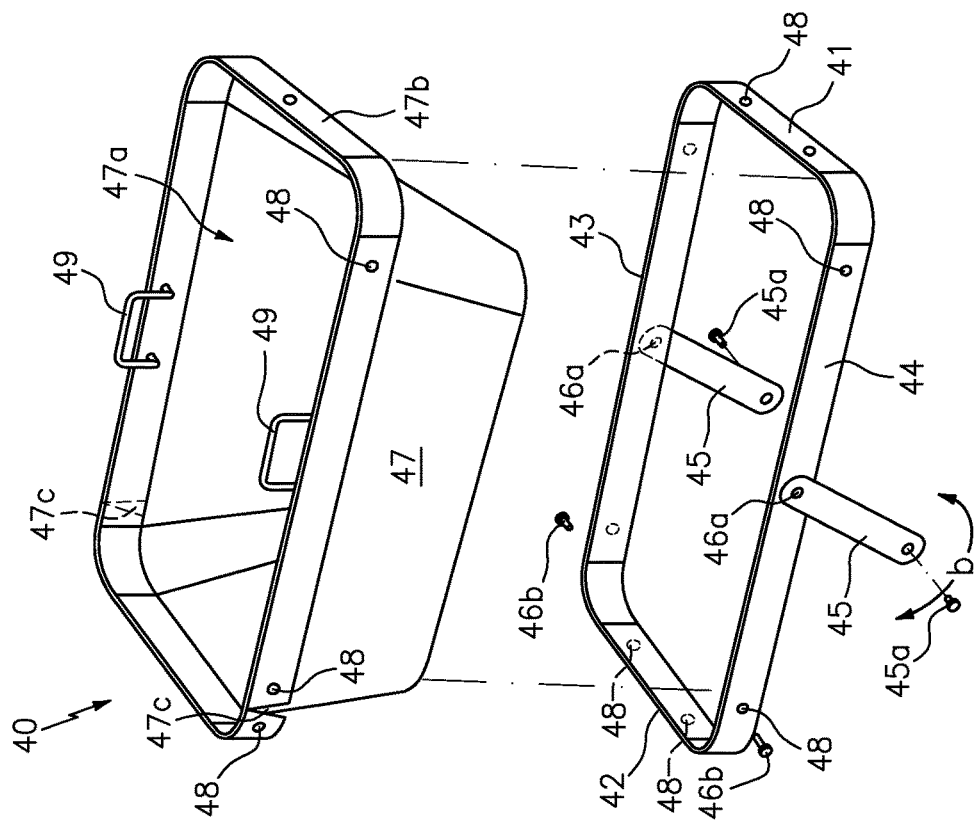
FIG. 4A is a perspective view of the basket assembly of the collapsible personal shopping cart, in accordance with one embodiment of the invention.

FIGS. 4A and 4B illustrate one embodiment of the basket assembly 40 that includes a generally rectangular basket frame having a front end 41, a rear end 42 and a pair of opposing sides 43 and 44. The basket frame is preferably constructed from a lightweight rigid material such as aluminum or plastic, for example, and includes a dimension suitable for allowing the frame to be suspended between the upper handle segments of the handle assembly.

As shown, a pair of elongated arms 45 can be pivotally secured to the opposing sides 43 and 44 along their top ends, via a first set of pivot couplers 46a. In this regard, each of the arms can rotate (see arrow b) so as to allow the basket to transition between the extended and collapsed position described below. As such, each of the arms can also include a coupler 45a, such as a male flange, for example, having a protruding edge with a shape and size that can be secured within the basket receiver channels 34, so as to slide along a length thereof.

In addition to the above, a second set of pivot couplers 46b can be disposed along the sides of the basket frame 43 and 44, at a location in line with, or adjacent to the rear end 42. The second set of pivot couplers 46b can function to pivotally secure the rear end of the basket frame 42 to the upper handle segments 31a and 31b, so as to allow the basket to transition between a collapsed orientation for storage, and an extended orientation for device usage.

As will be illustrated below, when the device 10 is in the extended configuration, the basket frame will be oriented generally perpendicular to the upper handle segments of the handle assembly, and the coupler 45a of the elongated arms 45 will be secured at the bottom ends of the basket receiver channels 34. Conversely, when the device 10 is in the collapsed configuration, the basket frame will be oriented generally parallel to the upper handle segments, and the coupler 45a of the elongated arms 45 will be secured at the top ends of the basket receiver channels 34.

The basket body 47 can preferably include a unitary construction that defines a central storage area 47a, having an upper sleeve 47b along an upper edge thereof. As shown, the sleeve can include cutouts 47c to accommodate the couplers 46b, and the basket body can be connected to each of the frame members 41, 42, 43 and 44 so as to extend downward therefrom. In various embodiments, the basket body can be permanently affixed to the frame members via adhesives or other such materials. In the preferred embodiment, the basket body 47 can be removably secured to the frame members via connectors 48 such as snaps buttons, magnets and the like. Of course, any number of other means for hanging the basket from the frame members in either a permanent or non-permanent manner are also contemplated.

In another embodiment, the basket body can further include a set of handle grips 49 which can function to allow a user to easily carry the basket body 47, and any contents located therein, when not utilizing the remaining portions of the device. In either instance, the basket section 47 can preferably be constructed from a sturdy fabric material such as nylon blend, vinyl and other such materials which have excellent tensile strength but are malleable enough to transition between a collapsed and an uncollapsed state. Of course, any number of other materials are also contemplated.

Figure 7:
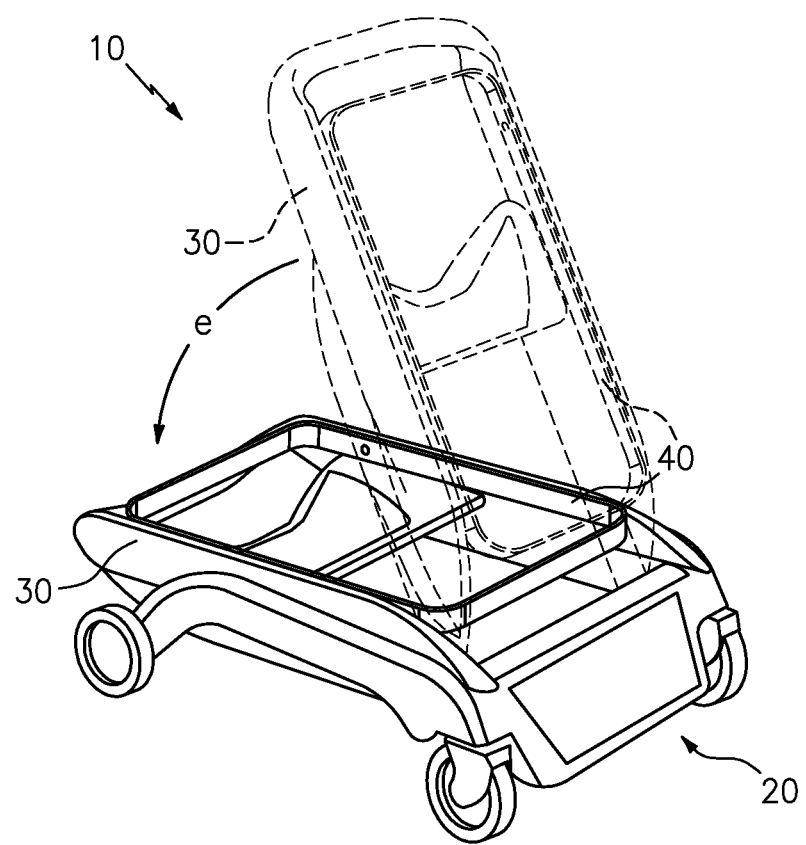
FIG. 7 is a side view of the collapsible personal shopping cart device in the fully collapsed position, in accordance with one embodiment of the invention.

FIGS. 5-7 illustrate one embodiment of the assembled device 10 in operation, while transitioning between a fully extended configuration and a fully collapsed configuration. As shown in FIG. 5, when the device is in the fully extended configuration, the handle assembly will be in its extended state, the bottom end of the handle assembly will be connected to the handle receivers, and the handle receivers will position the handle assembly in a vertical orientation. Additionally, the basket apparatus 40 will be extended so as to be oriented generally perpendicular to the upper handle segments.

FIG. 6 illustrates one embodiment of the device 10 in mid transition between the extended configuration of FIG. 5, and the collapsed configuration of FIG. 7. In the present illustration, the basket body 47 is removed, as described above, for ease of illustration. However, it is to be expressly understood that the basket body can remain attached to the device at all times regardless of the devices configuration. As shown by arrows c and d, the cart can collapse by transitioning the telescoping handle assembly 30 into the retracted position, and by rotating the basket assembly 40 to be parallel with the upper handle segments.

Finally, as shown by FIG. 7 and arrow e, the retracted handle assembly 30 can be rotated by the handle receivers to rest on top of the rolling frame assembly, thereby causing the frame assembly, and both the upper and lower handle assemblies to be stacked and aligned parallel to one another. Moreover, as the length (i.e., distance from top end to bottom end) of each of the upper and lower handle assemblies is complementary (i.e., substantially the same) to the length of the rolling frame assembly (i.e., distance from the front panel to the rear panel), the collapsed device will form a generally flat, rectangular shape that is easy to store.

As described herein, one or more elements of the personal shopping cart device 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements, may be formed together as one or more continuous element(s), either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A collapsible personal shopping cart device, comprising:
    a rolling frame assembly that includes:
        a plurality of rigid frame members,
        a plurality of wheels that are in communication with the plurality of rigid frame members, and
        a set of handle receivers that are secured to two of the plurality of rigid frame members having generally opposite orientations from each other;
    a telescoping handle assembly that includes:
        a set of generally parallel-oriented upper handle segments having a handle unit disposed along a top end thereof,
        a set of generally parallel-oriented lower handle segments that are in communication with the set of handle receivers, and
        a central support member having a unitary main body that is fixedly connected to a bottom end of each of the upper handle segments and is slidingly connected to each of the lower handle segments, said central support member functioning to transition the telescoping handle assembly between an extended state and a retracted state; and a basket assembly that includes:
  a rigid basket frame that is in communication with the upper handle segments, and
  a malleable basket body that is suspended from the rigid basket frame,
wherein the device is configured to transition between a fully extended configuration and a fully collapsed configuration.

2. The device of claim 1, further comprising:
a pair of elongated basket receiver channels that are disposed along each of the upper handle segments;
a set of pivot couplers that are interposed between the rigid basket frame and the upper handle segments at a location between the handle unit and the elongated basket receiver channels; and
a pair of elongated arms each having a first end that is pivotally connected to the rigid basket frame, and a second end that is slidingly connected to the basket receiver channels,
wherein the basket assembly is configured to transition between an extended basket position and a collapsed basket position.

3. The device of claim 2, wherein the upper handle segments, the lower handle segments and the rolling frame assembly each include a complementary length.

4. The device of claim 3, wherein in the fully collapsed position, each of the upper handle segments, the lower handle segments and the rolling frame assembly are stacked vertically and include a generally parallel orientation to each other.

5. The device of claim 4, wherein the device forms a generally flat rectangular shape in the fully collapsed configuration.

6. The device of claim 2, wherein the basket body is removably secured to the basket frame.

7. The device of claim 6, further comprising:
a set of handle grips that are disposed along the basket body.

8. The device of claim 2, wherein the basket frame is positioned at a generally perpendicular orientation to the upper handle segments when the basket is in the extended basket position.

9. The device of claim 2, wherein the basket frame is positioned at a generally parallel orientation to the upper handle segments when the basket is in the collapsed basket position.

10. The device of claim 2, wherein the basket body is permanently secured to the basket frame.

11. The device of claim 1, wherein the set of handle receivers are pivotally secured to the plurality of rigid frame members, and are configured to pivot the telescoping handle assembly between a generally horizontal position and a generally vertical position.

12. A collapsible personal shopping cart device, consisting of:
a rolling frame assembly that includes:
a plurality of rigid frame members,
a plurality of wheels that are in communication with the plurality of rigid frame members, and
a set of handle receivers that are secured to two of the plurality of rigid frame members having generally opposite orientations from each other;
a telescoping handle assembly that includes: a set of generally parallel-oriented upper handle segments having a handle unit disposed along a top end thereof, and
a set of generally parallel-oriented lower handle segments that are in communication with the set of handle receivers, said upper and lower handle segments being slidingly engaged via a central support member, and are configured to transition between an extended state and a retracted state; and
a basket assembly that includes:
a rigid basket frame that is in communication with the upper handle segments, and
a malleable basket body that is suspended from the rigid basket frame,
wherein the device is configured to transition between a fully extended configuration and a fully collapsed configuration.

* * * * *